United States Patent

[11] 3,627,081

| [72] | Inventor | Gerard R. Santos<br>Levittown, Pa. |
|---|---|---|
| [21] | Appl. No. | 846,553 |
| [22] | Filed | July 31, 1969 |
| [45] | Patented | Dec. 14, 1971 |
| [73] | Assignee | Boothe Airside Services, Inc. |

[54] BRAKE APPARATUS
7 Claims, 10 Drawing Figs.

[52] U.S. Cl. .................................................. 187/38,
187/73, 187/89, 188/180
[51] Int. Cl. ....................................................... B66b 1/24,
B66b 1/26
[50] Field of Search ........................................... 187/19, 89,
73, 38; 188/184, 187, 180

[56] References Cited
UNITED STATES PATENTS
| 3,232,382 | 2/1966 | Buck ........................... | 187/89 |
| 3,415,343 | 12/1968 | Svensson ..................... | 187/19 |

Primary Examiner—Harvey C. Hornsby
Assistant Examiner—Merle F. Maffei
Attorney—Stowell & Stowell ABSTRACT: Brake apparatus to prevent free fall of an elevatable body of a passenger transfer vehicle in event of failure of the lifting apparatus of the body. A control device senses an increase in normal lowering speed of the body and commands actuation of the brake apparatus. The control device also provides an electrical signal to disable the lifting apparatus of the body.

INVENTOR.
Gerard R. Santos
BY
William R. Nolte
AGENT

Patented Dec. 14, 1971

INVENTOR.
Gerard R. Santos
BY
William R. Nolte
AGENT

INVENTOR.
Gerard R. Santos
BY
William R. Nolte
AGENT

BRAKE APPARATUS

This invention has utility in the aircraft transfer vehicle shown and described in application Ser. No. 762,443, now U.S. Pat. No. 3,537,745, Inventor, James M. Herring, filed Sept. 25, 1968, entitled Aircraft Transfer Vehicle, and assigned to the same assignee as the present invention, In this application a passenger pod is described as being mounted for up-and-down lifting movement on a pair of lifting posts secured to the chassis of the vehicle. Lifting screws mounted externally of each of the lifting posts are rotated by a suitable drive system. The screws engage nuts held captive by the body and the latter is raised or lowered by the captive nuts depending upon the direction of rotation of the screws. In the event of failure of one or the other of the lifting screws the pod carrying the passengers would tend to fall relative to the upright masts in an uncontrolled manner. Unless the free fall of the body were arrested the safety of the passengers riding within would be endangered as well as causing damage to the vehicle.

Accordingly it is an object of this invention to provide an improved braking apparatus for a vehicle having a liftable body which avoids one or more of the disadvantages of prior art arrangements.

It is another important object of this invention to provide braking apparatus for arresting the free fall of a body of a vehicle in the event of failure of its lifting apparatus.

It is still another important object of this invention to provide braking apparatus responsive to control means for sensing an increase normal lowering speed of a body in a vehicle upon failure of its lifting apparatus to arrest free fail of said body.

In accordance with the invention an aircraft transfer vehicle having a chassis is provided with spaced vertical guide post means rigidly secured to the chassis. A body for carrying passengers is mounted for vertical movement on the lifting posts. Lifting means associated with the posts and the body are operative to raise and lower the body on the posts. Braking means comprising rotatable means with means for arresting said rotatable means are connected to said body and said lifting post means. Control means responsive to movement of said body on said post means includes means for actuating said arresting means to thereby stop the movement of said body along said lifting post means. Additional means responsive to said arresting means are provided for disabling said lifting means.

For a better understanding of the present invention, together with other and further objects thereof, reference is had to the following description taken in connection with the accompanying drawings.

Figure 1:
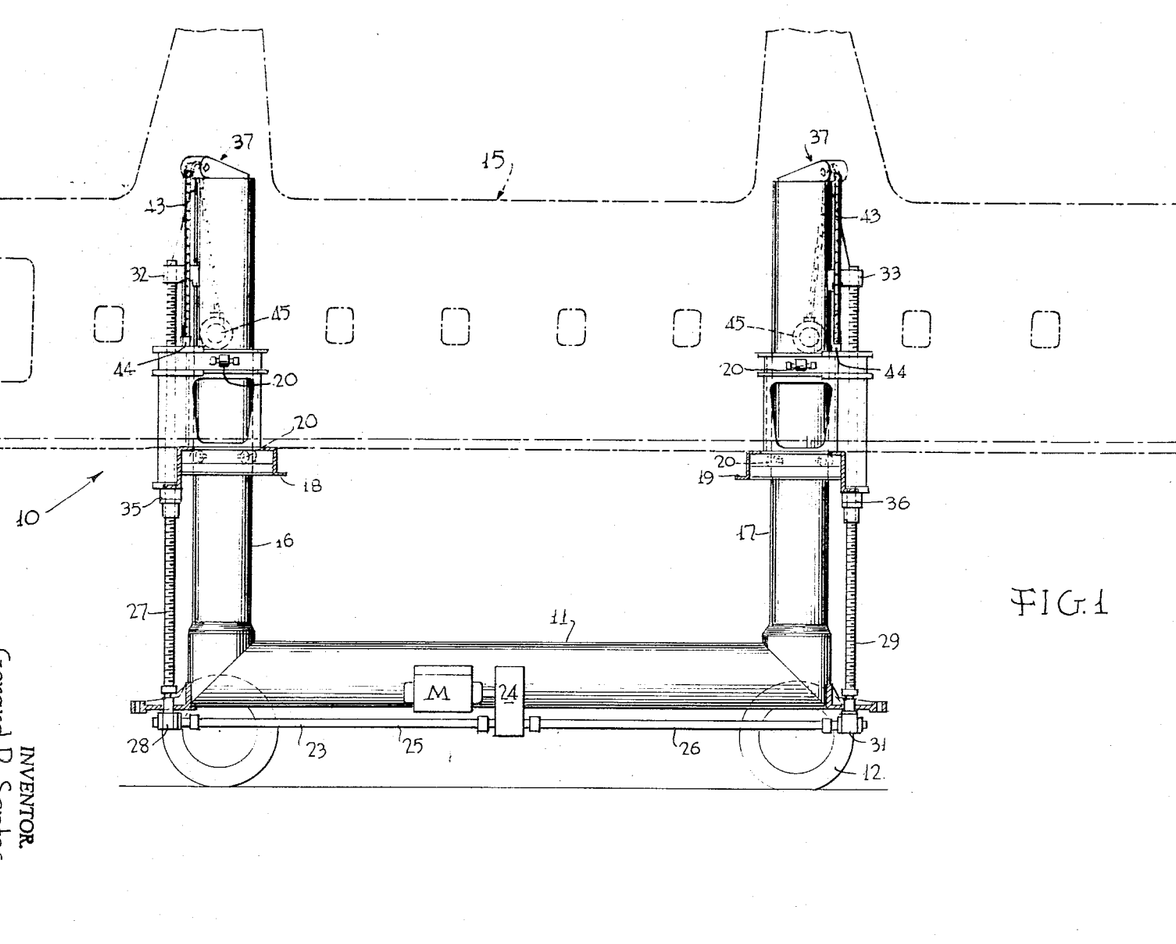
FIG. 1 is a side elevational view of an aircraft passenger transfer vehicle employing the brake apparatus of the present invention.

Referring now to FIG. 1 there is shown a passenger transfer vehicle 10 embodying brake apparatus of the present invention. The vehicle includes a chassis frame 11 with wheels 12 to enable the same to traverse the ground surface. A passenger pod 15 is mounted for up and down vertical movement on a pair of fore and aft spaced apart lifting posts 16 and 17 which are affixed at opposite ends of the chassis frame 11. For this purpose the pod 15 includes bolsters 18 and 19 having roller elements 20 to enable the passenger pod 15 to ride up and down on the lifting posts 16 and 17 respectively. To so raise and lower the pod a drive system 23 is provided. The drive system includes a motor M and a gear box 24 from which extends horizontally a pair of drive shafts 25 forward and 26 rear. Shaft 25 drives forward vertical screw shaft 27 by means of right-angle drive 28 and correspondingly rear horizontal shaft 26 drives rear vertical screw shaft 29 by a right-angle drive 31. Shaft 27 is suspended in parallel relationship to forward post 16 by means of bearing support 32. Shaft 29 is suspended in a similar manner by means of bearing support 33 on the rear lifting post 17. A captive nut arrangement 35, captive with respect to the under side of bolster 18, transmits the rotative force from shaft 27 into vertical motion of the bolster 18 to thereby lift or lower the pod 15. A similar captive nut arrangement as at 36 cooperates with the rear bolster 19 of the pod 15. In the event of failure of either of the lifting screws 27, 29 or any portion of the drive system, with the pod in the elevated position as shown, the pod will tend to fall thereby endangering the safety of the passengers within the event itself. To arrest the free fall of the vehicle in the event of malfunction of any of the elements of the drive system the novel braking apparatus 37 of the present invention is provided at the top of each lifting pole 16 and 17 of the vehicle. Control means 38, FIGS. 2, 4, responsive to a preset overspeed corresponding to free fall movement of the body 15 on lifting posts 16, 17 of the vehicle are provided to actuate the brake apparatus 37.

Figure 2:
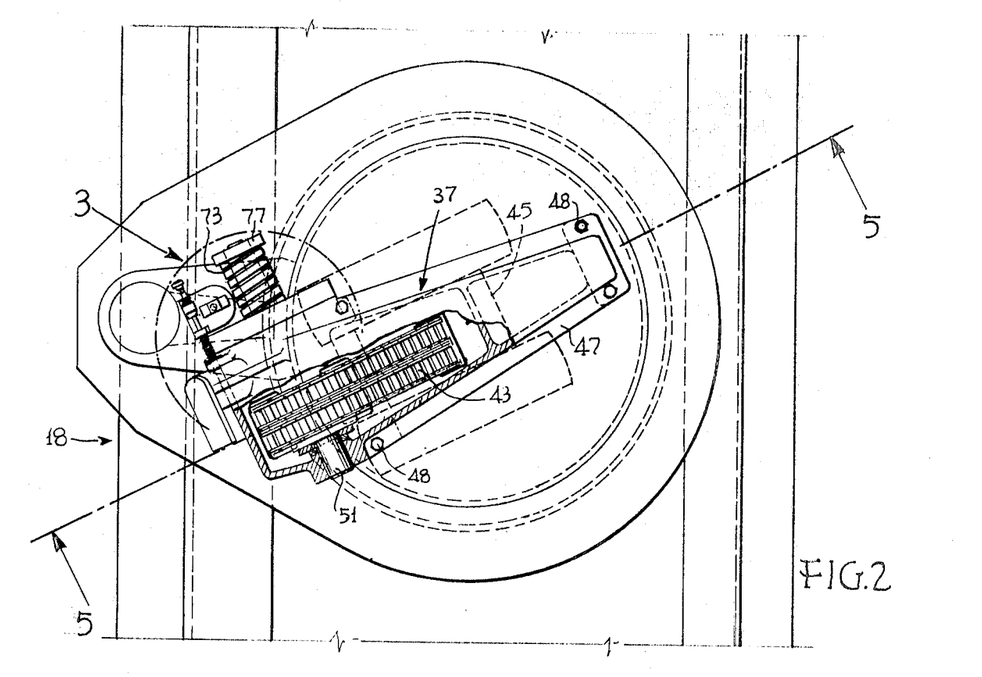
FIG. 2 is a view taken along the lines 2—2 of FIG. 1.
Figure 5:
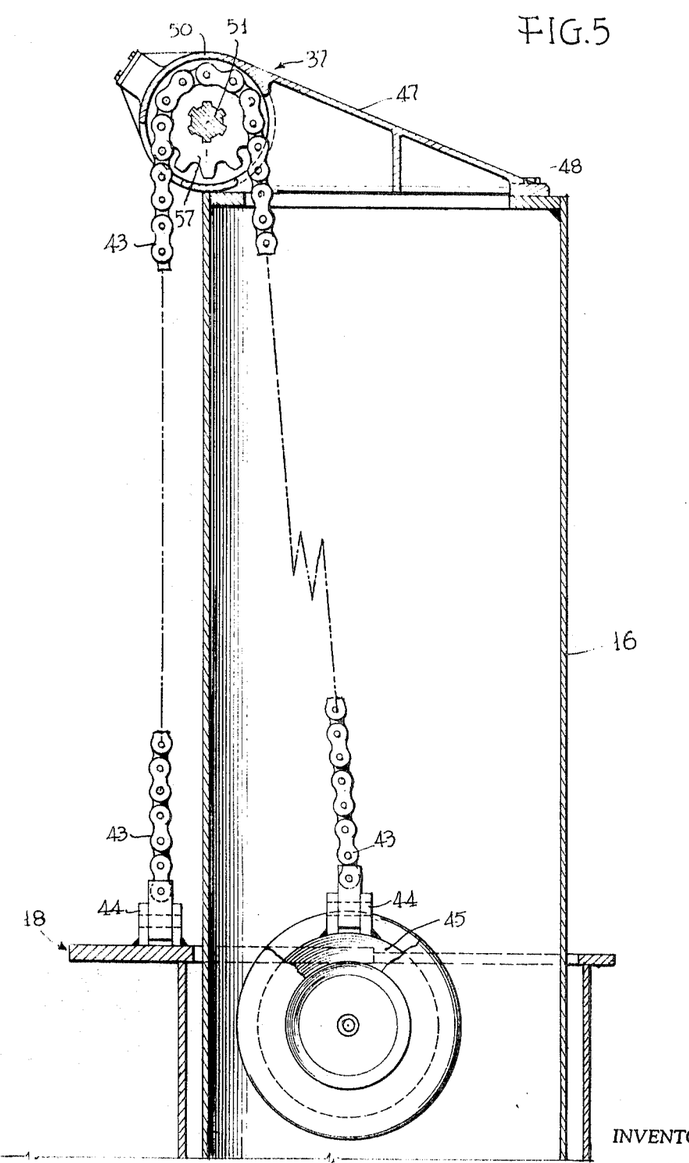
FIG. 5 is a view taken along the lines 5—5 of FIG. 2 showing an elevational sectional view through the braking apparatus and through one of the lifting poles of the vehicle.

Referring now to FIGS. 2 and 5, it is seen that the apparatus 37 includes a chain 43 connected at one of its ends by means of fitting 44 to the top portion of bolster 18 encircling lifting post 16. The chain 43 extends upwardly through an opening of the emergency brake apparatus 37 at the top of the lifting pole and includes a downwardly extending portion of chain 44 which at its extremity supports a wheeled counterweight 45. The counterweight 45 merely serves to provide tension in the free end of the chain 44 at all times through the emergency apparatus 37. The latter device includes a ribbed casing member 47 which spans diametrically the top open portion of the lifting post 16, being suitably bolted thereto by flange bolts 48 which pass through ring plate 49 extending transversely across the top inner portion of the lifting post 16.

Figure 4:
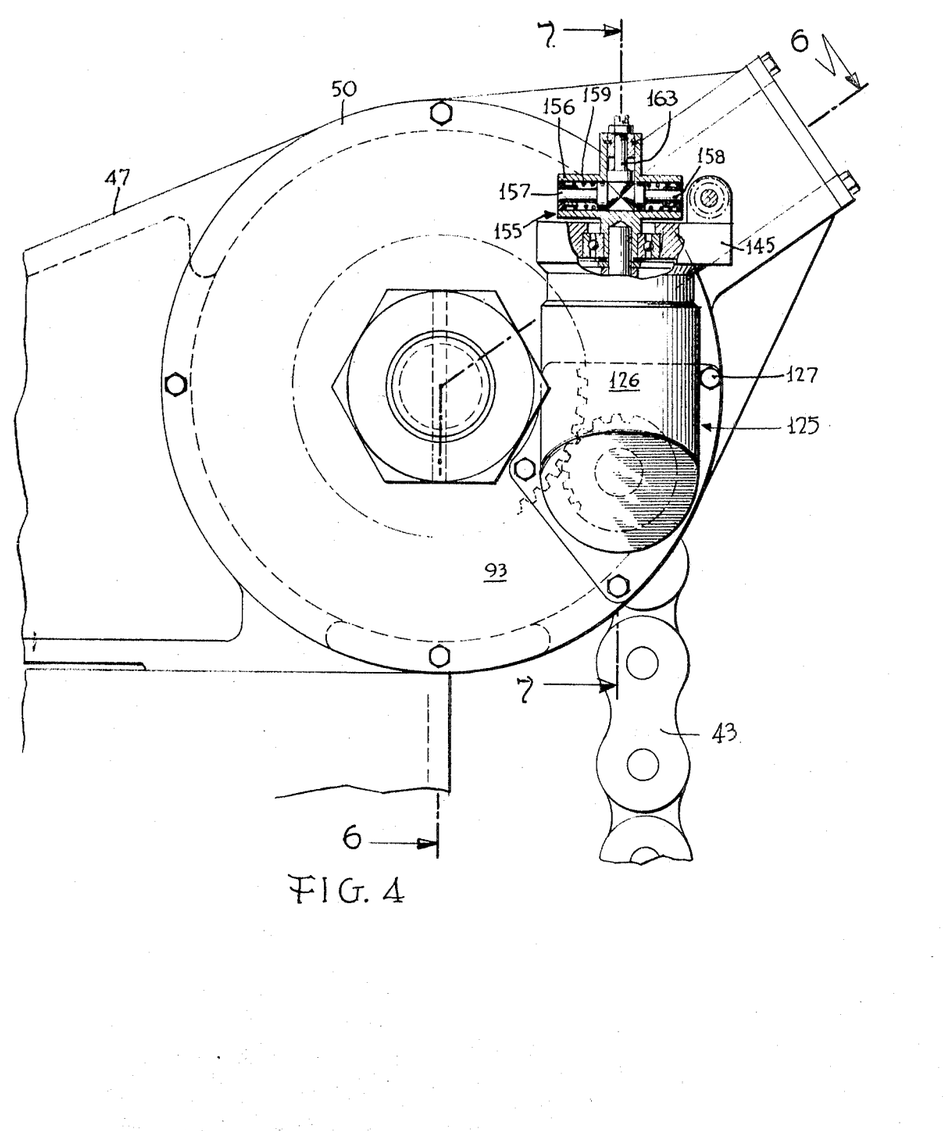
FIG. 4 is an elevational view of the brake apparatus taken along the lines 4—4 of FIG. 3.
Figure 6:
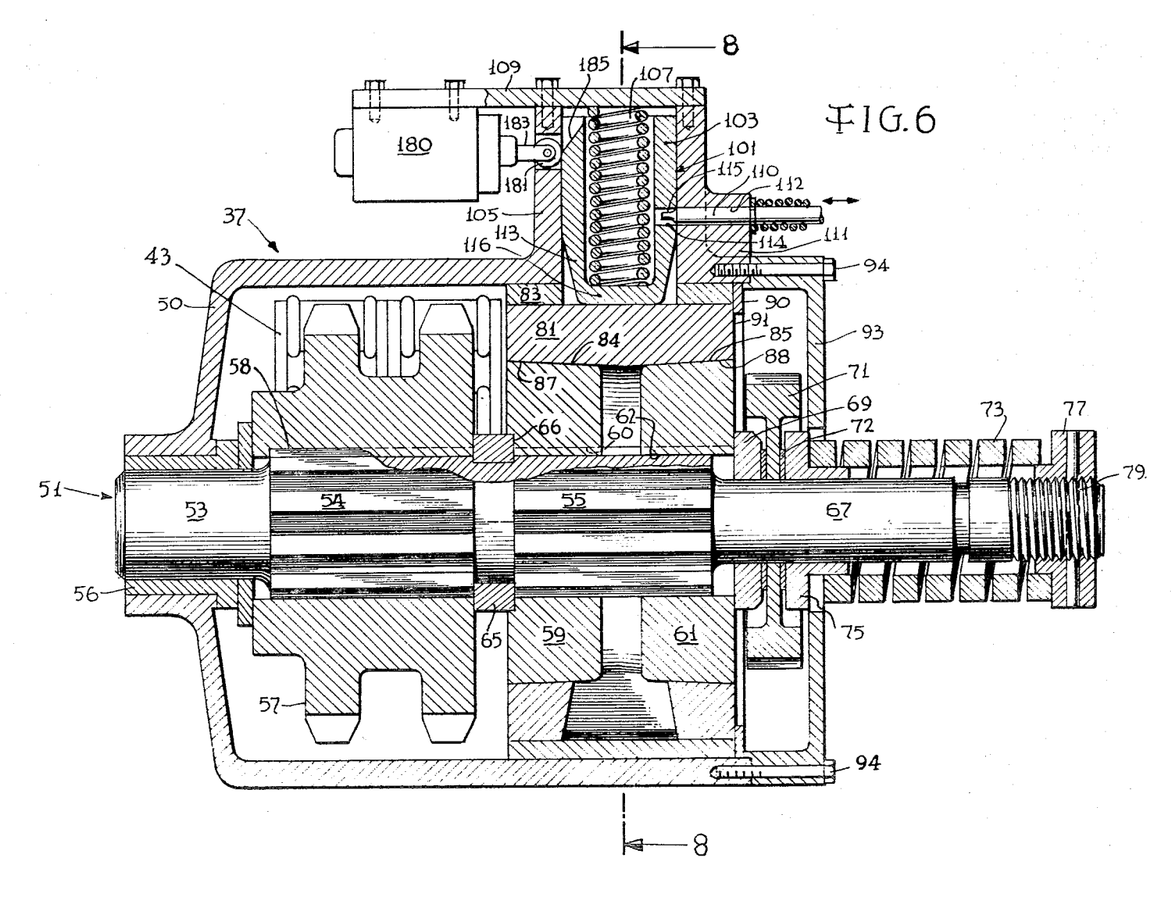
FIG. 6 is a sectional view taken along the lines 7—7 of FIG. 4.
Figure 10:
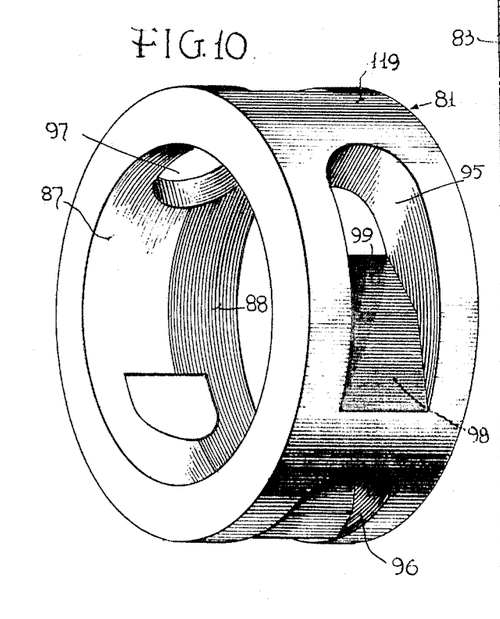
FIG. 10 is a three-quarter elevational view of the locking ring shown from its associated apparatus.

With reference now to FIGS. 4 and 6 it is noted that the housing 47 includes a cylindrical sleeve portion 50 which extends transversely of the ribbed portion of the housing. The cylindrical sleeve portion 50 of the housing supports rotation means 51 interiorly therein. The latter includes a shaft 53 having spaced apart splined portions 54, 55. One end of the shaft is mounted in a shoulder bearing 56. The first mentioned splined portion 54 receives a double sprocket 57 which in turn is driven by the aforementioned chain 43 seen in FIG. 5. The sprocket includes corresponding splines 58 which mate with the splined sections 54 of the shaft 53. The second splined portion 55 of the shaft 53 has mounted thereon a pair of spaced apart braking races 59 and 61 respectively. Each of the braking races includes interior splined portions 60 and 62 respectively to cause the same to be driven by the splined portion 55 of the shaft. The braking races 59, 61 are capable of moving axially of the shaft portion 55. A split ring 65 is locked in an undercut portion of the shaft between the splined portions of the shaft. The split ring is also received in a counterbore 66 within one side of braking race 59 and is effective to separate the sprocket 57 from the braking race 59. The shaft 53 includes an elongated outer portion 67 which receives a slip ring 69 which engages the outer face of friction race 61. The shaft portion 67 also has mounted thereon a spur gear 71 separated from the slip ring 69 by suitable washer means 72. The shaft 67 further includes a compression spring 73 which at one end makes contact with retaining ring 75 adjacent the spur gear 71. The opposite outer end of the spring 73 is engaged by an adjusting nut 77 which is received on the threaded portion 79 of the shaft portion 67. A locking ring 81, FIG. 10, encircles the two brake races 59 and 61 and is received within the inner diameter of internal bushing 83 pressed within the casing 50 of the device. The internal bushing 83 normally permits free turning motion of the shaft and its sprocket 57 and brake races 59 and 61 including locking ring 59 to turn relative to the bushing. The outer peripheral surfaces of braking races and race 61 are cone shaped as at surfaces 84 and 85 respectively. The cone surfaces 84 and 85 are inclined one with respect to the other. Correspondingly as best seen in FIG. 10 and also FIG. 6, the locking ring 81 includes inclined interior peripheral surface 87 and 88. The surfaces 87 and 88 are inclined with respect to each other. Surface 87 complements and coacts with surface 84 of braking race 59 while surface 88 coacts in a similar manner with inclined cone surface 85 of braking race 61. An outer washer 90 engages a portion of the outer surface 91 of locking ring 81 and prevents the same from "walking out" axially relative to shaft 53. A cover plate 93 engages the washer 90 and bolts 94 secure the cover in place relative to the casing 50.

Figure 8:
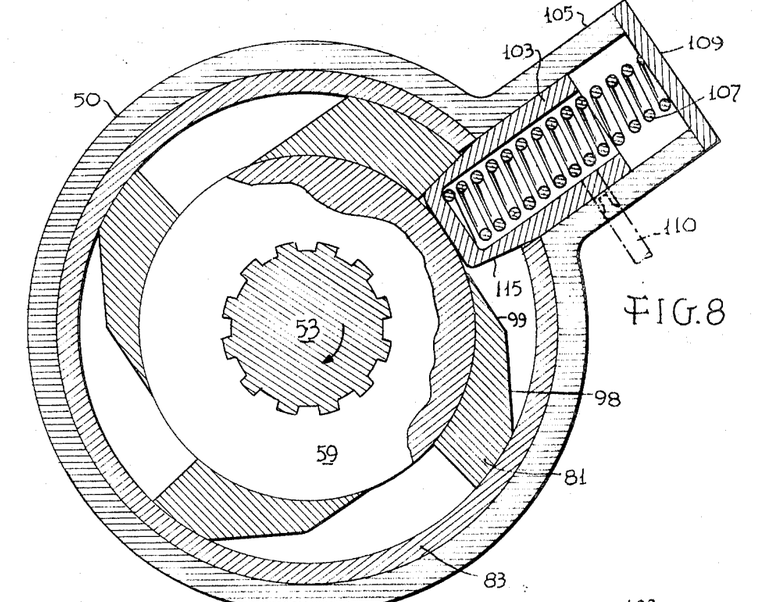
FIG. 8 is a sectional view taken along the lines 8—8 of FIG. 6.

Referring further to FIG. 10 the locking ring 81 is shown as including a plurality of grooves 95, 96, and 97 about its periphery. The grooves are elongated and include tongue portions 97 with sloping wedge surfaces 99 adjacent the inner peripheral wall surfaces of the ring. With reference now to FIG. 6, in order to arrest the rotation of locking ring 81, actuating pin means 101 are provided. The actuating pin means 101 includes a cup shaped member 103 which rides within a sleevelike appendage 105 extending radially outwardly from the cylindrical casing 50. A compression spring 107 is received within the cup 103. Its bottom end portion engages the bottom wall of the cup while the top portion of the spring 107 engages a plate 109 which closes off the top of the sleeve 105. A trigger pin 110 is mounted for axial movement relative to the axis of cup 103 and is received within a boss 111 which contains a bore 112 to permit motion of the trigger pin. The sidewall 113 of the actuating pin 103 includes an opening 114 into which is received the extremity 115 of trigger pin 110. When the latter pin 110 is moved so that its end 115 is withdrawn from opening 114 of the actuating cup member 103 the spring 107 within the cup causes the cup to be moved normal to the axis of the trigger pin 110. This latter motion is accomplished when a portion of the groove 95 in ring member 81 shown in FIG. 10 is opposite the bottom portion of the cup pin member 103. With further turning motion of the ring member by the shaft 53 and the brake race members 59 and 61, as seen in FIG. 8, rotation of the shaft 53 in the direction of the arrow as indicated will through brake race 59 carry locking ring 81 in a clockwise rotation such that the cup member 103 engages the end wall 116 of the locking groove 95 of the ring member 81.

Figure 9:
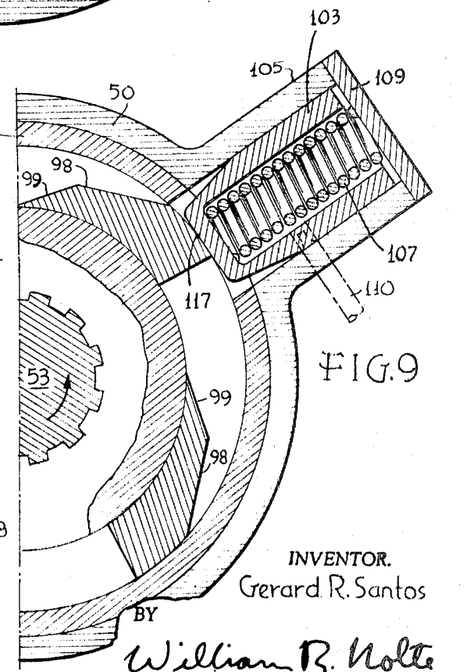
FIG. 9 is a sectional view similar to that shown in FIG. 8 but illustrating the reset function of the arresting means.

With reference to FIG. 6 it is seen that since the split ring 65 is retained on shaft 53 by the counterbore 66 of the friction disk 59, the same reacts to the main spring pressure 73 applied to the opposite braking race 61 through slip ring 69, spur gear 71 and retaining ring 75. The aforementioned reaction wedges the brake race 59 and the action braking race 61 together against the outer encircling locking ring 81, FIG. 10, and thereby creating the necessary braking race 61, and encircling locking ring 81. Since the rotation of shaft 53 is arrested, the chain sprocket 57 carried by the shaft will also be arrested and thereby preventing movement of the chain 43. Moreover, since the chain 43 at its lower end is fastened to the bolster 18 of the passenger pod 15 the latter will be arrested and prevented from likewise moving relative to the lifting post 16, 17 if the chassis of the vehicle. When it is desired to reset the actuating cup pin 103 from its locking position as shown in FIG. 8 to its unlocked position as shown in FIG. 9, shaft 53 is rotated in a counterclockwise direction as indicated in FIG. 9. In this action, the aforementioned tongue 98 forming part of the groove margins of groove 95 of locking ring 81 coact with the bottom surface 117 of the actuating pin 103. More specifically the bottom surface 117 first engages the wedge or inclined surface 99 of the extremity of the tongue 98 within the groove 95 of the ring. The pin 103 is thus caused to ride upwardly on the inclined surface 99 and also a further contiguous inclined surface 97 of the tongue. The latter surface merges with the outer peripheral surface 119 of the ring. At this point in the rotation of the ring the actuating pin 103 is totally withdrawn from the groove and the aforementioned trigger pin may then be moved into locking engagement in aperture 114 of sidewall 113 of the actuating pin.

Figure 7:
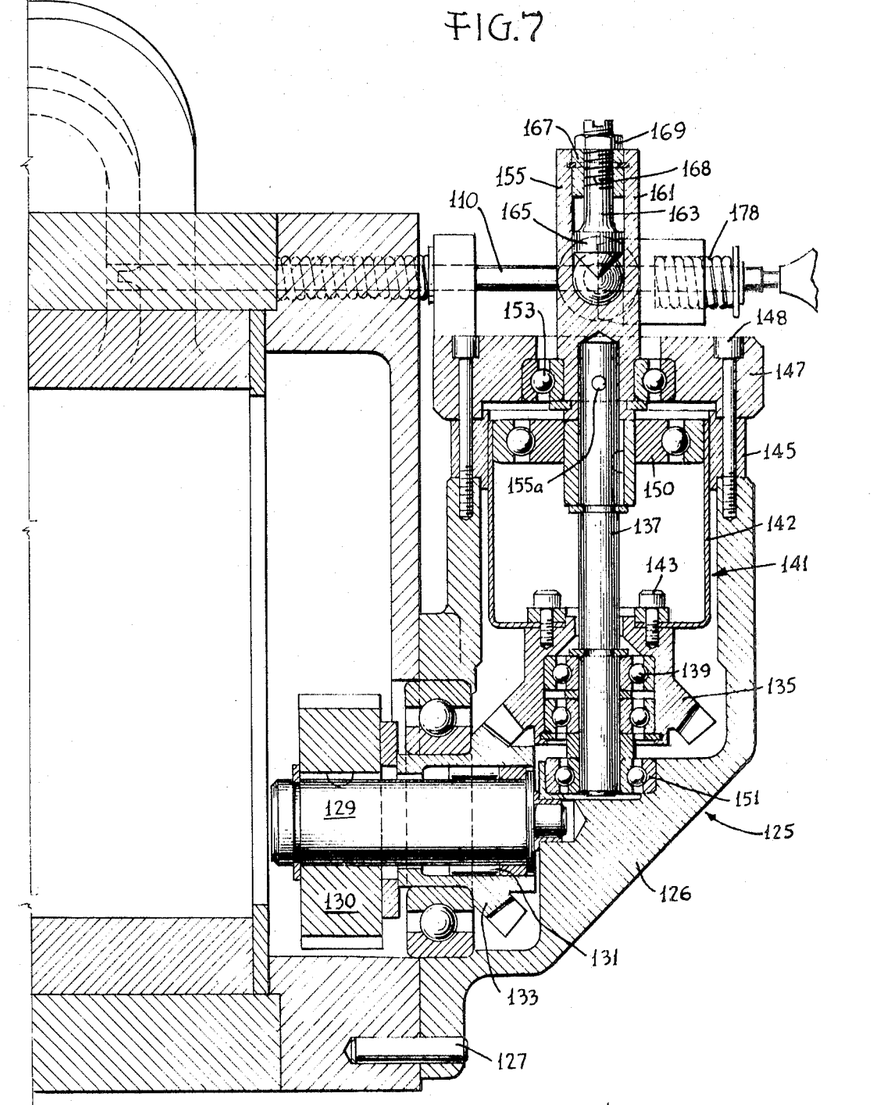
FIG. 7 is a sectional view taken along the lines 7—7 of FIG. 4.

In order that the aforedescribed brake apparatus come into operation, control means 125 responsive to the movement of the passenger pod and the rotatable means of the brake apparatus are provided to actuate the trigger pin 110 to thereby release the actuating pin means 103 of the brake. For this purpose the control means 125 includes the casing 126 which is bolted to the cover plate 93 by bolts 127, as indicated in FIGS. 4 and 7. A pinion shaft 129 having pinion 130 keyed thereto is mounted within the housing by means of bearing 131. The pinion 130 is driven by the aforementioned spur gear 71 affixed to shaft 53 of the brake apparatus. See FIG. 6. Shaft 129 in addition carries a one-way clutch 131 of the type described in U.S. Pat. No. 3,194,368. The outer sleeve of the aforementioned clutch carries a mitre gear 133 which in turn meshes with a vertical mitre gear 135 mounted for rotation about shaft 137 by means of bearings 139. The vertical mitre gear 135 drives a harmonic drive device 141 of the type described in U.S. Pat. No. 2,906,143. The latter harmonic drive unit includes a very thin but relatively flexible ringlike sleeve 142 which is secured at its base to the upright vertical mitre gear by means of bolts 143. The aforementioned thin flexible ring includes splined teeth which meshes with a rigid circular outer ring 145 which is clamped between the upper edge of the casing 126 and the top cover 147 by means of bolts 148. A third element 150 of said harmonic device described in the latter patent includes a wave generator which is suitably affixed to the aforementioned shaft 137. The aforementioned shaft 137 is supported in the casing 126 at its lower end by means of bearing 151 and its upper end portion within the top cover member 147 by means of bearing 153. A rotor crosshead 155 is affixed to the top end of the shaft 137 by means of pin 155. The rotor crosshead includes a horizontal sleeve portion 156 within which ride a pair of opposed pins 157, 158. The latter pins are urged toward the axis of shaft 137 by means of springs 159. The upper portion of the centrifugal crosshead 156 includes a vertical sleeve portion 161 into which is mounted a vertically movable pin 163. It includes a lower portion 165 which coacts with the spring driven centrifugal pins 157 and 158. The sleeve 161 includes a threaded bushing 167 which in turn coacts with the threaded portion 168 in the vertical adjusting pin 163. By adjusting the thread connection the adjusting pin determines the spring loading on the centrifugal pins 157 and 158. A jam nut 169 enables the adjusting pin 163 to be locked in place.

Figure 3:
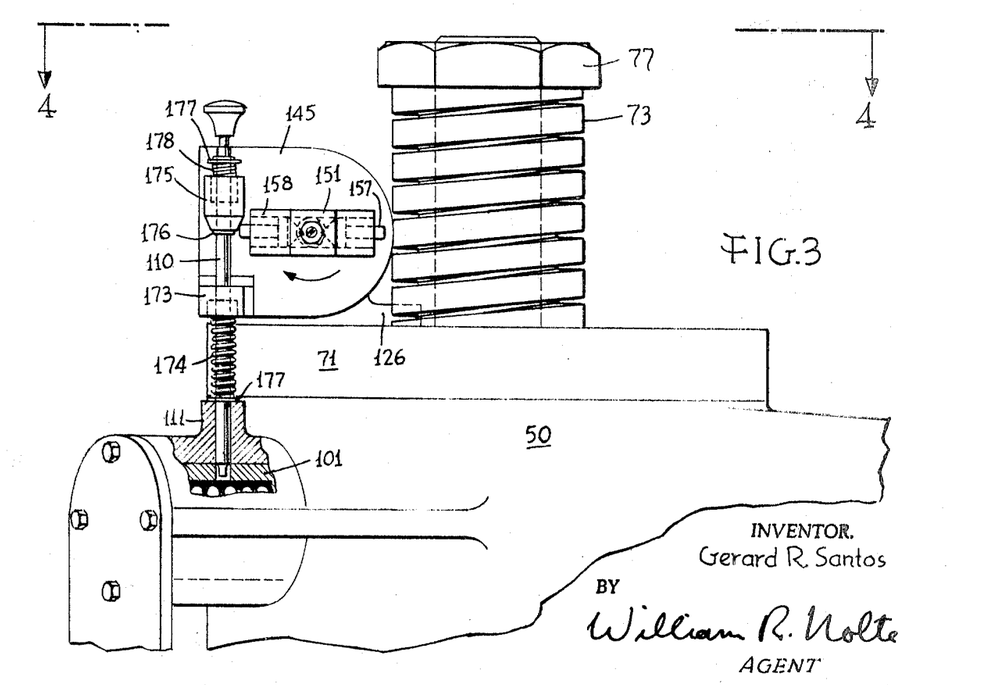
FIG. 3 is an enlarged view of a portion encircled in FIG. 2.

Referring now to FIGS. 3 and 4, it is seen that the top cover of the speed sensor casing 126 includes an apertured gear or boss 173 which supports the intermediate position of the trigger pin 110. A friction spring 174 encircles the pin and is disposed intermediate the boss 173 and the boss 11 of the actuating pin device. The spring wire 174 constitutes a casing to provide a slight controlled frictional drag against movement of trigger pin 110 along its axis. The outer end portion adjacent the centrifugal head 151 includes a plunger 175 mounted for slidable movement on the pin. A pair of washer stops 176, 177 are provided on opposite sides of the block with a spring 178 encircling the pin between the plunger 175 and washer 177. Upon the centrifugal head reaching a predetermined speed of rotation, one of the pins 157 or 158 will fly out and hit the plunger 175 spring loaded against washer 176. Spring 178 cushions the shock of plunger 175 against washer 177. Upon compressing spring 178 the plunger will move along the pin to touch washer 177 and the motion will continue pulling the trigger pin 110 against the friction of spring 174 thus releasing the opposite end 115 of the trigger 110 out of blocking engagement with spring loaded plunger 101 (FIG. 6).

In order to disable the motor M to prevent operation of the drive system 23, FIG. 1, after release of plunger 101 (FIG. 6) switch means 180 are shown attached to the undersurface of plate 109. Roller 181 attached to shaft 183 follows the side surface of plunger cup member 103. The latter includes a cam surface 185 along its top rim portion. When the plunger cup 103 is in its up position the switch 180 enables activation of the drive motor M. However, when the plunger is activated to its braking position corresponding to that shown in FIG. 8 the shaft 183 and roller 181 are enabled to move to their phantom line position as shown, In this latter position of the switch the motor M is disabled by means of suitable electrical interlock.

From the foregoing description it is noted that in normal operation with the passenger pod 15 travelling up and down on the lifting posts 16, 17 the chain 43 will rotate sprocket 57, braking races 59, 61, and all of the parts mounted on it including locking ring 81. The latter ring 81 including the aforementioned parts turn as a unit in relation to internal bushing 83. The sprocket 57 is enabled to move on the splines 54 to adjust itself to lateral variations of movement of chain 43. The split ring 65 is retained on the counterbore 66 of brake race 59 and reacts to the great spring pressure applied by main spring 73. The reaction wedges the braking races 59, 61, against the inclined inner surfaces 87, 88 of locking ring 81. In an emergency operation, the speed sensor device 125, FIG. 7, is effective to activate the trigger pin 110. Due to the one-way clutch 131 the sensor mechanism will only rotate in one direction when the pod 15 is being lowered. The motion transmitted from shaft 53 of the brake apparatus to mitre gear 133 is at a desired multiplication. Moreover the output of the harmonic drive device, i.e. sleeve 141, ring 145 and rotor 150 is greatly multiplied to rotate the centrifugal crosshead at a speed sufficient to cause pins 157, 158 to move trigger pin 110. When this occurs the actuating pin 103 slides under spring pressure from spring 107 on the periphery 119 of lock ring 81, into groove 95 to contact the end wall 116 of the groove, thus bringing the locking ring to a stop. The other parts turned by shaft 53, i.e. braking races 59, 61 keep turning in relation to the braking surfaces 84, 85, 86, 88, to thereby develop the necessary braking torque to arrest the rotation of shaft 53 and thereby stop further downward movement of the pod 15 in its lifting posts 16, 17. The aforementioned electrical interlock via switch 180 will simultaneously disable any lifting action of the drive system 23. Since identical braking devices 36 are associated with each of the lifting poles 16, 17, failure of the lifting screw associated with one lifting pole will through such interlock disable the drive associated with the opposite lifting pole.

While there has been described what at present is considered to be the preferred embodiment of this invention, it will be obvious to those skilled in the art that various changes and modifications may be made therein without departing from the invention, and it is aimed in the appended claims to cover all such changes and modifications as fall within the true spirit and scope of the invention.

We claim:

1. A transfer vehicle having a chassis member, wheel means mounted on said chassis member for transporting the vehicle, a pair of spaced vertical guide posts rigidly secured to said chassis member, a body member mounted for slidable upward and downward movement on said guide posts, operating means for raising and lowering said body member on said posts at a predetermined speed, means for controlling the downward movement of said body on said guide posts in the event of failure of said operating means, including means journaled for rotation on one of said guide posts, and having friction means connected to said body means for rotating said rotation means, arresting means, said arresting means including plunger means, pin means movable in one position to block movement of said plunger means and movable to a second position to release said plunger means for movement, spring means to move said plunger means into engagement with said friction means, and sensor means responsive to said rotation means upon movement of said body in excess of said normal speed to release said plunger means for movement.

2. In the vehicle as set forth in claim 1 wherein said rotatable means include cone means, and wherein said friction means engage said cone means, to arrest said rotatable means.

3. In the vehicle as set forth in claim 2, wherein said rotatable means include shaft means, said cone means including inclined surfaces and being slidable axially on said shaft means, said friction means including surfaces coacting said inclined surfaces, and means for urging said cone means axially of said rotation means.

4. In the vehicle as set forth in claim 3, wherein said urging means include compression spring means encircling said rotatable means, and including means to vary the compression rate of said compression spring means.

5. In the vehicle as set forth in claim 1 wherein said pin means include cam surface means and wherein said plunger means engage said cam surface to assist in withdrawing said pin means out of blocking movement with said plunger means.

6. In the vehicle as set forth in claim 1 wherein said friction means is generally cylindrically shaped and includes a groove for reception of said plunger means, said friction means further including a tonguelike portion defining a cam surface, whereby rotation of said friction means corresponding to upward movement of said body is effective to reset said arresting means to its said one position.

7. In the vehicle as set forth in claim 1 wherein said sensor means includes spring-loaded centrifugal spring means coactable with said pin means to release said arresting means and means driven by said rotatable means to rotate said centrifugal means.

* * * * *